(12) United States Patent
Lee

(10) Patent No.: US 8,146,355 B2
(45) Date of Patent: Apr. 3, 2012

(54) TRAVELING DEVICE FOR CRAWLER TYPE HEAVY EQUIPMENT

(75) Inventor: Jae Hoon Lee, Changwon-si (KR)

(73) Assignee: Volvo Construction Equipment Holdings Sweden AB, Eskilstuna (SE)

( * ) Notice: Subject to any disclaimer, the term of this patent is extended or adjusted under 35 U.S.C. 154(b) by 753 days.

(21) Appl. No.: 12/154,049

(22) Filed: May 20, 2008

(65) Prior Publication Data

US 2008/0289325 A1 Nov. 27, 2008

(30) Foreign Application Priority Data

May 21, 2007 (KR) .................... 10-2007-0049373

(51) Int. Cl.
*F15B 11/00* (2006.01)
*B62D 11/06* (2006.01)
(52) U.S. Cl. .......................................... 60/421; 60/428
(58) Field of Classification Search ............. 60/421, 60/428, 429, 484, 486
See application file for complete search history.

(56) References Cited

U.S. PATENT DOCUMENTS

| | | | | |
|---|---|---|---|---|
| 5,083,428 A | * | 1/1992 | Kubomoto et al. | 60/421 |
| 5,692,377 A | * | 12/1997 | Moriya et al. | 60/421 |
| 5,829,252 A | * | 11/1998 | Hirata et al. | 60/421 |
| 6,430,922 B2 | * | 8/2002 | Tohji | 60/421 |
| 6,708,490 B2 | * | 3/2004 | Toji et al. | 60/421 |
| 7,178,333 B2 | * | 2/2007 | Oka | 60/421 |
| 7,412,827 B2 | * | 8/2008 | Verkuilen | 60/428 |
| 7,614,225 B2 | * | 11/2009 | Kim | 60/421 |

* cited by examiner

*Primary Examiner* — Thomas E Lazo
(74) *Attorney, Agent, or Firm* — Ladas & Parry LLP

(57) ABSTRACT

A traveling device for crawler type heavy equipment is provided, which can improve manipulability by preventing an abrupt decrease/increase of a traveling speed of the equipment when a combined operation, in which a left/right traveling device and a working device are simultaneously driven, is performed. The traveling device for crawler type heavy equipment includes a variable orifice shifted to intercept the supply of the hydraulic fluid toward the traveling device in response to the signal pressure in the combined working mode if a load pressure of the working device is relatively higher than that of the traveling device.

2 Claims, 4 Drawing Sheets

US 8,146,355 B2

TRAVELING DEVICE FOR CRAWLER TYPE HEAVY EQUIPMENT

CROSS-REFERENCE TO RELATED APPLICATION

This application is based on and claims priority from Korean Patent Application No. 10-2007-0049373, filed on May 21, 2007 in the Korean Intellectual Property Office, the disclosure of which is incorporated herein in its entirety by reference.

BACKGROUND OF THE INVENTION

1. Field of the Invention

The present invention relates to a traveling device for crawler type heavy equipment, which can prevent an abrupt change of a traveling speed when a traveling device and a working device are simultaneously operated in a crawler type excavator.

More particularly, the present invention relates to a traveling device for crawler type heavy equipment, which can improve the manipulability by preventing an abrupt decrease/increase of a traveling speed of the equipment so much that an operator can feel such an abrupt decrease/increase of the traveling speed when a combined operation, in which a left/right traveling device and a working device such as a boom are simultaneously driven, is performed.

2. Description of the Prior Art

As illustrated in FIG. 1, a conventional hydraulic circuit of a traveling device for heavy equipment includes first and second variable displacement hydraulic pumps 1 and 2 and a pilot pump 3 which are connected to an engine; a switching valve 5 for a left traveling motor and switching valves 6, 7, and 8 for working devices (e.g., a swing, a boom, an arm, and the like) which are installed in a first center bypass passage 4 of the first hydraulic pump 1; a switching valve 10 for a right traveling motor and switching valves 11 and 12 for working devices (e.g., a boom, a bucket, and an arm) which are installed in a second center bypass passage 9 of the second hydraulic pump 2; and a straight traveling valve 13 installed on an upstream side of the second center bypass passage 9, and shifted (in a right direction in the drawing), in response to a signal pressure from the pilot pump 3, to supply hydraulic fluid fed from the first hydraulic pump 1 to the switching valves 5 and 10 for the left and right traveling motors, respectively, and to supply hydraulic fluid fed from the second hydraulic pump 2 to the switching valves 6, 7, 8, 11, and 12 for the working devices, respectively.

In the drawing, reference numerals 14 and 15 denote left and right traveling pedals, and 16 and 17 denote joysticks for controlling the switching valves 6 and 11 for the working devices. A reference numeral 18 denotes a controller for outputting control signals to electro proportional valves 19 and 20 so as to control discharged flow rates of the first and second hydraulic pumps 1 and 2 by controlling inclination angles of swash plates of the first and second hydraulic pumps 1 and 2, and for outputting a control signal to an electric control valve 21 so that the signal pressure fed from the pilot pump 3 is supplied to the straight traveling valve 13. A reference numeral 26 denotes a main control valve (MCV).

The hydraulic fluid fed from the first hydraulic pump 1 is supplied to the switching valve 5 for the left traveling motor and to the switching valves 6, 7, and 8 for the working devices through the straight traveling valve 13. The hydraulic fluid fed from the second hydraulic pump 2 is supplied to the switching valve 10 for the right traveling motor and to the switching valves 11 and 12 for the working devices through the straight traveling valve 13.

On the other hand, in the case of simultaneously operating the left/right traveling device and the working device, the electric control valve 21 is shifted by the control signal inputted from the controller 18, and thus the straight traveling valve 13 is shifted in the right direction, as shown in the drawing, by the pilot signal pressure fed from the pilot pump 3 through a flow path 28.

Accordingly, the hydraulic fluid fed from the first hydraulic pump 1 is supplied to the switching valve 5 for the left traveling motor and to the switching valve 10 for the right traveling motor through the straight traveling valve 13.

The hydraulic fluid fed from the second hydraulic pump 2 is supplied to the switching valves 6 and 11 for the working devices through the straight traveling valve 13 and flow paths L1 and L2.

Accordingly, the hydraulic fluid fed from the first hydraulic pump 1 is supplied to the left/right traveling device of the equipment, and the hydraulic fluid fed from the second hydraulic pump 2 is supplied to the working devices of the equipment, so that the straight traveling performance of the equipment can be secured.

At this time, the hydraulic fluid discharged from the first hydraulic pump 1 is dividedly supplied to the switching valves 5 and 10 for the left and right traveling motors. That is, the flow rate is reduced by half to cause the traveling speed of the equipment also to be reduced by half, and thus an operator feels travel shock due to the reduction of the traveling speed.

As illustrated in FIG. 2, a conventional hydraulic circuit of a traveling device for heavy equipment includes first and second variable displacement hydraulic pumps 1 and 2 and a pilot pump 3 which are connected to an engine; a switching valve 5 for a left traveling motor and switching valves 6, 7, and 8 for working devices which are installed in a first center bypass passage 4 of the first hydraulic pump 1; a switching valve 10 for a right traveling motor and switching valves 11 and 12 for working devices which are installed in a second center bypass passage 9 of the second hydraulic pump 2; a straight traveling valve 13 installed on an upstream side of the second center bypass passage 9, and shifted (in a right direction in the drawing), in response to a signal pressure from the pilot pump 3, to supply hydraulic fluid fed from the first hydraulic pump 1 to the switching valves 5 and 10 for the left and right traveling motors, respectively, and to supply hydraulic fluid fed from the second hydraulic pump 2 to the switching valves 6, 7, 8, 11, and 12 for the working devices, respectively; and a fixed orifice 23 installed in a confluence passage 22 for connecting in parallel a flow path L2 branched from the upstream side of the second center bypass passage 9 and the second center bypass passage 9, the fixing orifice 23 supplying a part of the hydraulic fluid fed to the working device to the traveling device, when the traveling device and the working device are simultaneously operated, to prevent an abrupt reduction of a traveling speed.

In the drawing, a reference numeral 24 denotes a check valve installed in the confluence passage 22.

Since the above-described construction, except for the fixed orifice 23 and the confluence passage 22 in which the check valve 24 is installed, is substantially the same as the construction as illustrated in FIG. 2, the detailed description thereof will be omitted. In the following description of the present invention, the same drawing reference numerals are used for the same elements across various figures.

Accordingly, in the case of simultaneously driving the left/right traveling device and the working device, a part of the hydraulic fluid fed from the second hydraulic pump 2 to the working device through the flow path L2 is supplied to the traveling device through the confluence passage 22, and thus the abrupt reduction of the traveling speed can be prevented.

At this time, if load pressure generated on the working device side is higher than load pressure generated on the traveling device side (e.g., in the case of pulling-up operation), most hydraulic fluid discharged from the second hydraulic pump 2, which should be supplied to the working device) is supplied to the traveling device through the confluence passage 22.

Accordingly, the working device is not driven, but the traveling speed is abruptly increased, so that the manipulability of the equipment is lowered, and thus an operator may instantaneously make erroneous manipulation.

SUMMARY OF THE INVENTION

Accordingly, the present invention has been made to solve the above-mentioned problems occurring in the prior art while advantages achieved by the prior art are maintained intact.

One object of the present invention is to provide a traveling device for crawler type heavy equipment, which can improve the manipulability and prevent an erroneous manipulation of the equipment by preventing an abrupt decrease/increase of a traveling speed of the equipment so much that an operator can feel such an abrupt decrease/increase of the traveling speed when a combined operation, in which a left/right traveling device and a working device are simultaneously driven, is performed.

In order to accomplish these objects, there is provided a traveling device for crawler type heavy equipment, according to the present invention, which includes first and second variable displacement hydraulic pumps; a switching valve for a left traveling motor and switching valves for working devices which are installed in a first center bypass passage of the first hydraulic pump; a switching valve for a right traveling motor and switching valves for working devices which are installed in a second center bypass passage of the second hydraulic pump; a straight traveling valve installed on an upstream side of the second center bypass passage, and shifted in response to a signal pressure supplied from an outside, in a working mode for simultaneously operating the traveling device and the working device, to supply hydraulic fluid fed from the first hydraulic pump to the switching valves for the left and right traveling motors, respectively, and to supply hydraulic fluid fed from the second hydraulic pump to the switching valves for the working devices, respectively; a variable orifice installed in a confluence passage for connecting in parallel a flow path branched from the upstream side of the second center bypass passage and the second center bypass passage, and shifted in response to the signal pressure supplied from the outside, in the working mode for simultaneously operating the traveling device and the working device, to intercept the supply of the hydraulic fluid, being supplied to the working device, toward the traveling device through the confluence passage if a load pressure generated in the working device is relatively higher than a load pressure of the traveling device; a mode selection device for selecting a working mode; and a controller for outputting control signals to electro proportional valves for variably controlling inclination angles of swash plates of the first and second hydraulic pumps and to electric control valves for controlling the signal pressures fed to the straight traveling valve and the variable orifice, so as to control discharged flow rates of the first and second hydraulic pumps in accordance with the working mode selected through the mode selection device.

In another aspect of the present invention, there is provided a traveling device for crawler type heavy equipment, which includes first and second variable displacement hydraulic pumps; a switching valve for a left traveling motor and switching valves for working devices which are installed in a first center bypass passage of the first hydraulic pump; a switching valve for a right traveling motor and switching valves for working devices which are installed in a second center bypass passage of the second hydraulic pump; a straight traveling valve installed on an upstream side of the second center bypass passage, and shifted in response to a signal pressure formed in a control valve, in a working mode for simultaneously operating the traveling device and the working device, to supply hydraulic fluid fed from the first hydraulic pump to the switching valves for the left and right traveling motors, respectively, and to supply hydraulic fluid fed from the second hydraulic pump to the switching valves for the working devices, respectively; a variable orifice installed in a confluence passage for connecting in parallel a flow path branched from the upstream side of the second center bypass passage and the second center bypass passage, and shifted in response to the signal pressure supplied from the outside, in the working mode for simultaneously operating the traveling device and the working device, to intercept the supply of the hydraulic fluid, being supplied to the working device, toward the traveling device through the confluence passage if a load pressure generated in the working device is relatively higher than a load pressure of the traveling device; a mode selection device for selecting a working mode; and a controller for outputting control signals to electro proportional valves for variably controlling inclination angles of swash plates of the first and second hydraulic pumps and to an electric control valve for controlling the signal pressure fed to the variable orifice, so as to control discharged flow rates of the first and second hydraulic pumps in accordance with the working mode selected through the mode selection device.

In a preferred embodiment of the present invention, the electric control valve may include a solenoid valve shifted, in response to an input of the control signal from the controller, to control the signal pressure being supplied to the straight traveling valve and the variable orifice, respectively.

In a preferred embodiment of the present invention, the electric control valve may include an electro proportional valve shifted, in response to an input of the control signal from the controller, to control the signal pressure being supplied to the straight traveling valve and the variable orifice, respectively.

The traveling device for crawler type heavy equipment according to a preferred embodiment of the present invention may further include manipulation sensing devices for the working devices for sensing the signal pressure fed to the switching valves for the working devices connected to the first and second hydraulic pumps, respectively, when joysticks are manipulated, and outputting sensed signals to the controller; and manipulation sensing devices for the traveling device for sensing the signal pressure fed to the switching valves for the left and right traveling motors, when traveling pedals are pressed, and outputting sensed signals to the controller.

In a preferred embodiment of the present invention, the manipulation sensing device for the traveling device or the working device may include a pressure sensor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
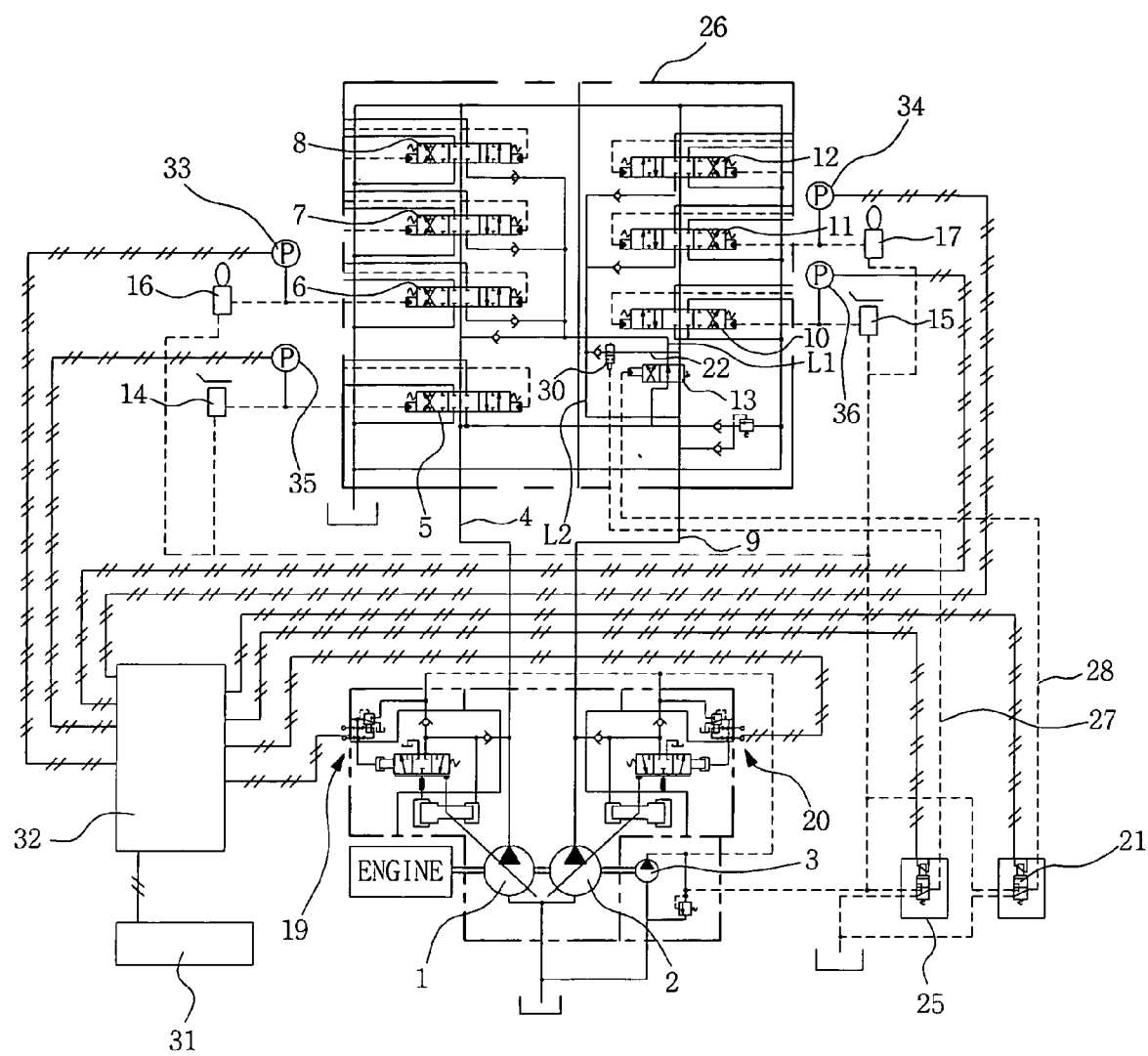
FIG. 3 is a circuit diagram of a hydraulic circuit of a traveling device for crawler type heavy equipment according to an embodiment of the present invention.

As illustrated in FIG. 3, the traveling device for crawler type heavy equipment according to an embodiment of the present invention includes first and second variable displacement hydraulic pumps 1 and 2 and a pilot pump 3 connected to an engine; a switching valve 5 for a left traveling motor and switching valves 6, 7, and 8 for working devices which are installed in a first center bypass passage 4 of the first hydraulic pump 1; a switching valve 10 for a right traveling motor and switching valves 11 and 12 for working devices which are installed in a second center bypass passage 9 of the second hydraulic pump 2; a straight traveling valve 13 installed on an upstream side of the second center bypass passage 9, and shifted in response to a signal pressure supplied from a pilot pump 3, in a working mode for simultaneously operating the traveling device and the working device, to supply hydraulic fluid fed from the first hydraulic pump 1 to the switching valves 5 and 10 for the left and right traveling motors, respectively, and to supply hydraulic fluid fed from the second hydraulic pump 2 to the switching valves 6, 7, 8, 11, and 12 for the working devices, respectively; a variable orifice 30 installed in a confluence passage 22 for connecting in parallel a flow path L2 branched from the upstream side of the second center bypass passage 9 and the second center bypass passage 9, and shifted in response to the signal pressure supplied from the pilot pump 3, in the working mode for simultaneously operating the traveling device and the working device, to intercept the supply of the hydraulic fluid, being supplied to the working device, toward the traveling device through the confluence passage 22 if a load pressure generated in the working device is relatively higher than a load pressure of the traveling device; a mode selection device 31 for selecting a specified working mode; and a controller 32 for outputting control signals to electro proportional valves 19 and 20 for variably controlling inclination angles of swash plates of the first and second hydraulic pumps 1 and 2 and to electric control valves 21 and 25 for controlling the signal pressures fed from the pilot pump 3 to the straight traveling valve 13 and the variable orifice 30, so as to control discharged flow rates of the first and second variable displacement hydraulic pumps 1 and 2 in accordance with the working mode selected through the mode selection device 31.

In a preferred embodiment of the present invention, the electric control valve 21 or 25 includes a solenoid valve shifted, in response to an input of the control signal from the controller 32, to control the signal pressure being supplied to the straight traveling valve 13 and the variable orifice 30, respectively.

In a preferred embodiment of the present invention, the electric control valve 21 or 25 includes an electro proportional valve (not illustrated) shifted, in response to an input of the control signal from the controller 32, to control the signal pressure being supplied to the straight traveling valve 13 and the variable orifice 30, respectively.

The traveling device for crawler type heavy equipment according to a preferred embodiment of the present invention further includes manipulation sensing devices 33 and 34 for the working devices for sensing the signal pressure fed to the switching valves 6 and 11 for the working devices connected to the first and second hydraulic pumps 1 and 2, respectively, when joysticks 16 and 17 are manipulated, and outputting sensed signals to the controller 32; and manipulation sensing devices 35 and 36 for the traveling device for sensing the signal pressure fed to the switching valves 5 and 10 for the left and right traveling motors, when traveling pedals 14 and 15 are pressed, and outputting sensed signals to the controller 35.

In a preferred embodiment of the present invention, the manipulation sensing device 35, 36, 33, or 34 for the traveling device or the working device includes a pressure sensor.

A neutral port of the straight traveling valve 13 is formed to supply the hydraulic fluid fed from the first hydraulic pump 1 to the switching valve 5 for the left traveling motor and the switching valves 6, 7, and 8 for the working devices connected in series or in parallel to the switching valve 5 for the left traveling motor, and to supply the hydraulic fluid fed from the second hydraulic pump 2 to the switching valve 10 for the right traveling motor and the switching valves 11 and 12 for the working devices connected in series or in parallel to the switching valve 10 for the right traveling motor.

Figure 1:
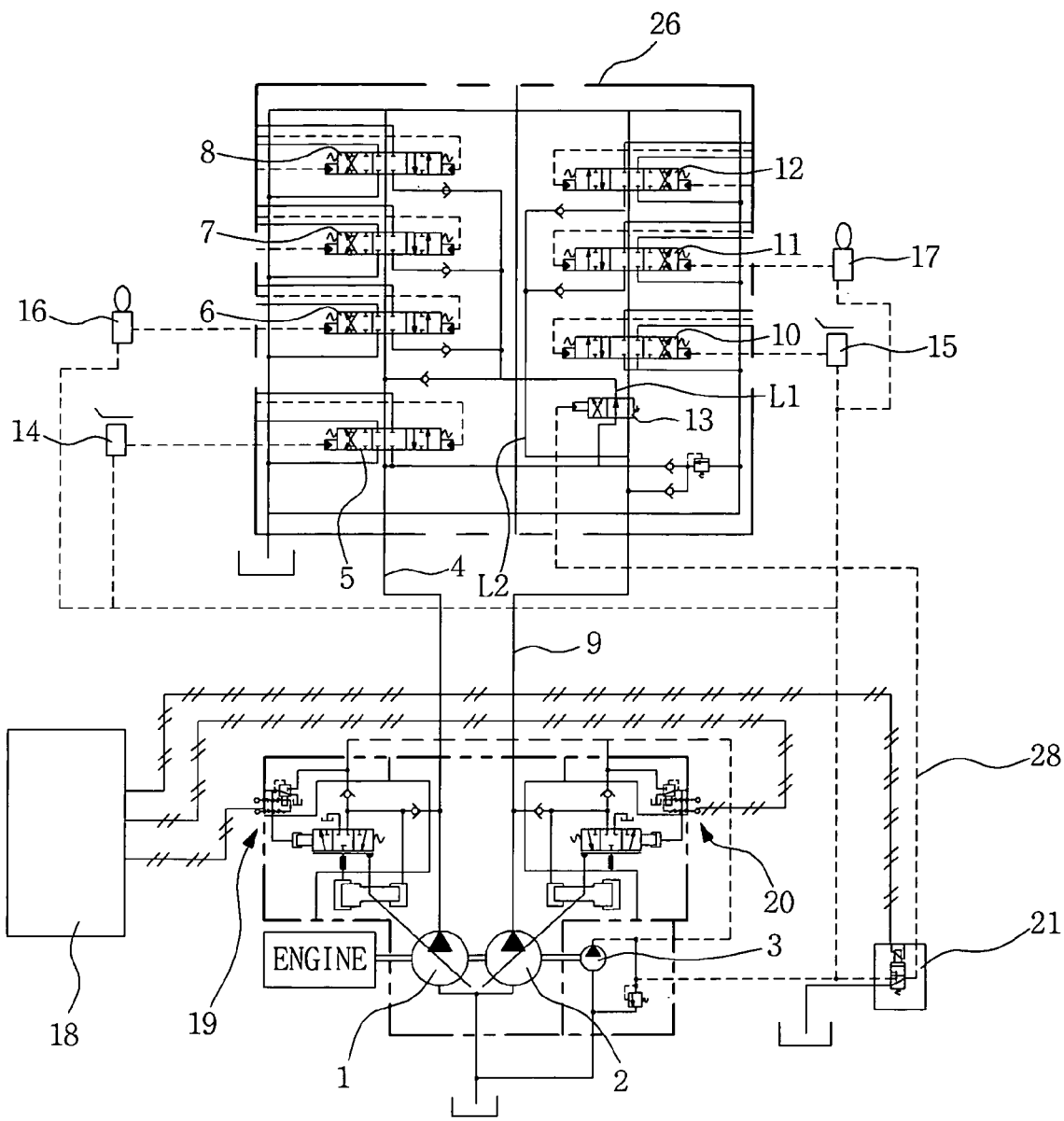
FIG. 1 is a circuit diagram of a conventional hydraulic circuit of a traveling device for heavy equipment.
Figure 2:
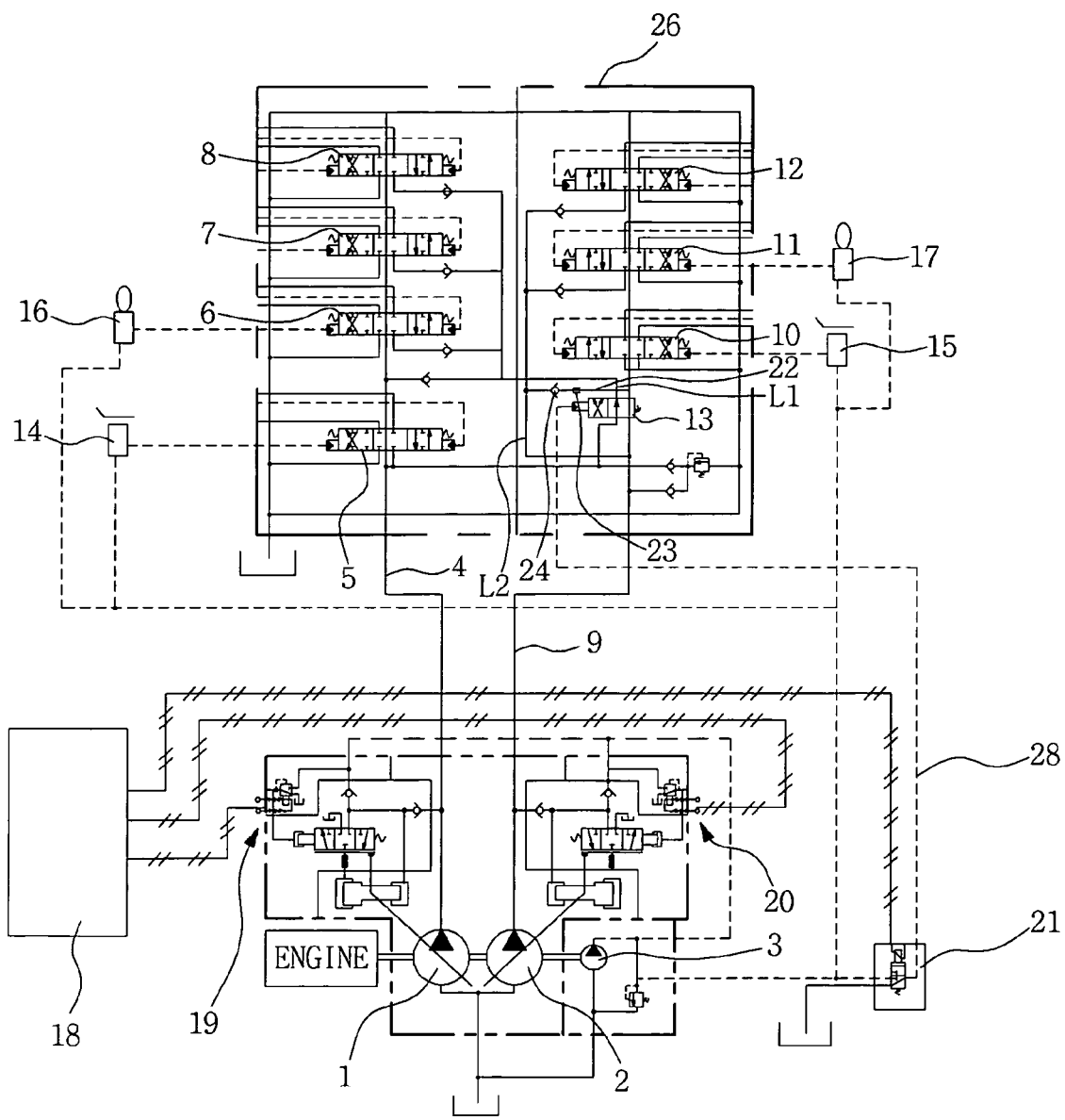
FIG. 2 is a circuit diagram of another conventional hydraulic circuit of a traveling device for heavy equipment.

Since the above-described construction, except for the variable orifice 30 installed in the confluence passage 22, the electric control valve 25 for controlling the signal pressure fed to the variable orifice 30, the mode selection device 31, the manipulation sensing devices 33 and 34 of the working devices, and the manipulation sensing devices 35 and 36 of the traveling device, is substantially the same as the construction as illustrated in FIG. 2, the detailed description thereof will be omitted. In the following description of the present invention, the same drawing reference numerals are used for the same elements across various figures.

Hereinafter, the operation of the traveling device for crawler type heavy equipment according to an embodiment of the present invention will be described in detail with reference to the accompanying drawings.

As illustrated in FIG. 3, in the case of selecting a standard working mode through the mode selection device 31, the hydraulic fluid discharged from the first and second variable displacement hydraulic pumps 1 and 2, in accordance with the manipulation amount of the joysticks 16 and 17 and the pressing force of the traveling pedals 14 and 15, is supplied to the traveling motors and a hydraulic cylinder through the switching valves 5 and 10 for the left and right traveling motors and the switching valves 6 and 11 for the working devices.

At this time, if the joysticks 16 and 17 and the traveling pedals 14 and 15 are manipulated at full stroke, corresponding actuators can be operated at maximum operating speed by the hydraulic fluid fed from the first and second hydraulic pumps 1 and 2.

In the case of selecting a working mode in which the traveling device and the working device are simultaneously operated through the mode selection device 31, inner spools of the electric control valve 21 are shifted in downward direction as shown in the drawings by the control signal outputted from the controller 32.

Accordingly, the signal pressure discharged from the pilot pump 3 is supplied to the straight traveling valve 13 through the electric control valve 21 and a pilot flow path 28, and thus the inner spools of the electric control valve 21 are shifted in right direction as shown in the drawing.

A part of the hydraulic fluid fed from the second hydraulic pump 2 to the working device is supplied to the traveling device side through the variable orifice 30. Accordingly, the abrupt reduction of the traveling speed so much that the operator can feel it is prevented from occurring.

On the other hand, in the case of driving the working device by manipulation of the joysticks 16 and 17 in a state that a specified working mode is selected through the mode selection device 31, hydraulic fluid at the maximum flow rate is discharged from the first and second hydraulic pumps 1 and 2 by the controller 32, while in the case of driving the traveling device, hydraulic fluid at a certain flow rate (e.g., about 70% of the maximum flow rate) is discharged from the first and second hydraulic pumps 1 and 2.

In the case of simultaneously operating the traveling device and the working device by manipulating the traveling pedals 14 and 15 and the joysticks 16 and 17, sensed signals from the manipulation sensing devices 33 and 34 for the working devices and the manipulation sensing devices 35 and 36 for the traveling device are inputted to the controller 32. Accordingly, the inclination angles of the swash plates of the first and second hydraulic pumps 1 and 2 are controlled in accordance with the control signals outputted from the controller 32 to the electro proportional valves 19 and 20, and thus the hydraulic fluid at the maximum flow rate is discharged from the first and second hydraulic pumps 1 and 2.

The electric control valve 25 is shifted in upward/downward direction, as shown in the drawing, in accordance with the control signal outputted from the controller 32. The signal pressure fed from the pilot pump 3 is supplied to the variable orifice 30 through the electric control valve 25 and the pilot flow path 27, and the inner spools thereof are shifted in upward direction as shown in the drawing.

The inner spools of the electric control valves 21 and 25 are shifted in downward direction, as shown in the drawing, in accordance with the control signals outputted from the controller 32. The signal pressure from the pilot pump 3 is supplied to the straight traveling valve 13 and the variable orifice 30 through the electric control valves 21 and 25 and the pilot flow paths 28 and 27 to shift the straight traveling valve 13 and the variable orifice 30. Accordingly, the confluence passage 22 is blocked due to the spool shift of the variable orifice 30.

That is, in a working mode in which the traveling device and the working device are simultaneously operated, the confluence passage 22 is blocked, and thus a part of the hydraulic fluid from the working device is not supplied to the traveling device side through the confluence passage 22. In this case, the hydraulic fluid from the first hydraulic pump 1 is dividedly supplied to the left traveling motor and the right traveling motor, and thus the traveling speed of the equipment that travels at a certain traveling speed (e.g., "70") is reduced (e.g., to "50").

That is, as the traveling speed of the equipment is reduced from "70" to "50", the travel shock due to the reduction of the traveling speed can be reduced.

On the other hand, in the working mode for simultaneously operating the traveling device and the working device, if load pressure generated in the working device is relatively higher than load pressure generated in the traveling device, the confluence passage 22 is shifted to be blocked, and thus the supply of the hydraulic fluid, being fed to the working device, to the traveling device side is prevented. Accordingly, abrupt increase of the traveling speed of the equipment can be prevented.

Figure 4:
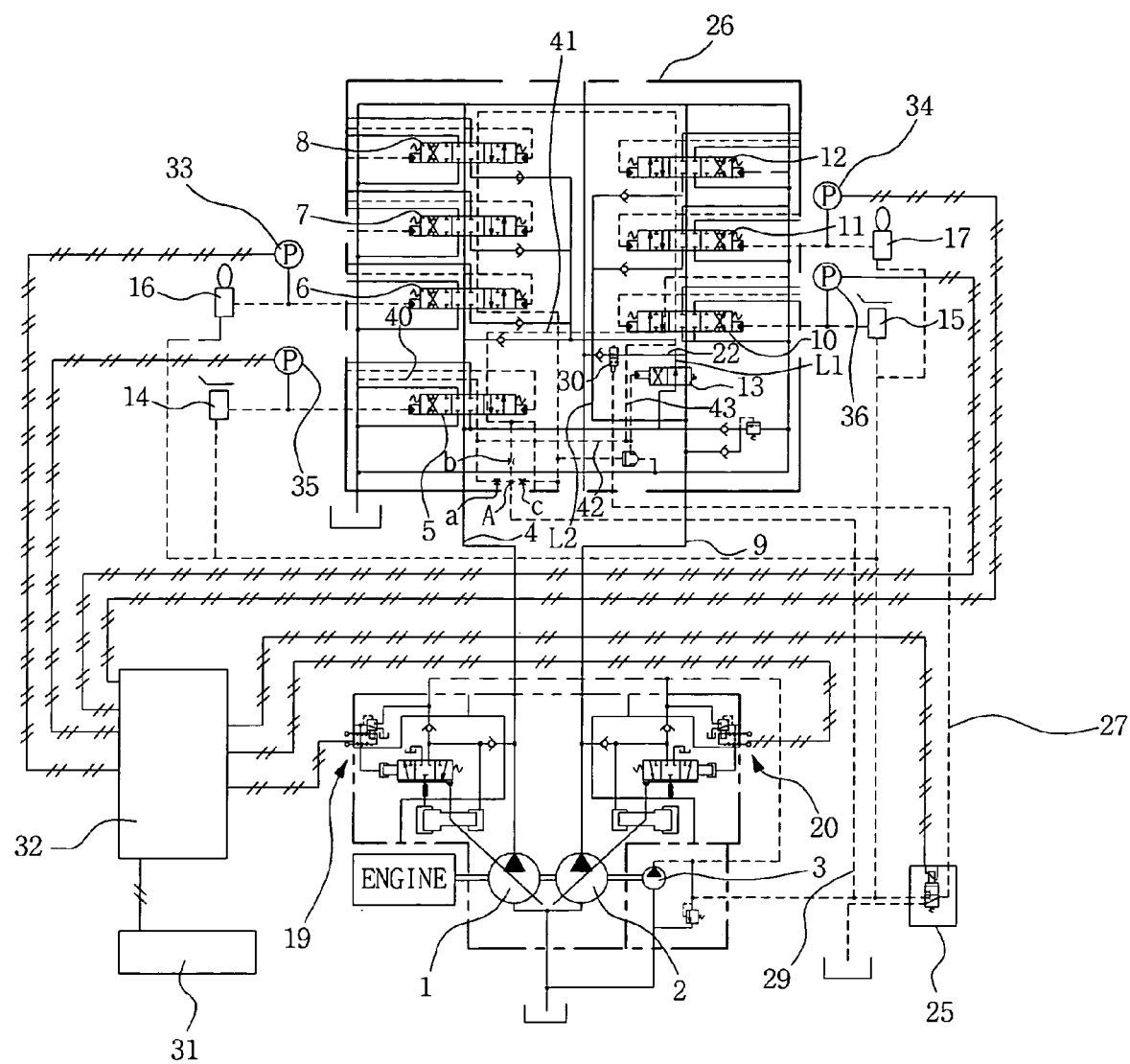
FIG. 4 is a circuit diagram of a hydraulic circuit of a traveling device for crawler type heavy equipment according to another embodiment of the present invention.

As illustrated in FIG. 4, the traveling device for crawler type heavy equipment according to another embodiment of the present invention includes first and second variable displacement hydraulic pumps 1 and 2 and a pilot pump 3 connected to an engine; a switching valve 5 for a left traveling motor and switching valves 6, 7, and 8 for working devices which are installed in a first center bypass passage 4 of the first hydraulic pump 1; a switching valve 10 for a right traveling motor and switching valves 11 and 12 for working devices which are installed in a second center bypass passage 9 of the second hydraulic pump 2; a straight traveling valve 13 installed on an upstream side of the second center bypass passage 9, and shifted in response to a signal pressure formed in a control valve 26, in a working mode for simultaneously operating the traveling device and the working device, to supply hydraulic fluid fed from the first hydraulic pump 1 to the switching valves 5 and 10 for the left and right traveling motors, respectively, and to supply hydraulic fluid fed from the second hydraulic pump 2 to the switching valves 6, 7, 8, 11, and 12 for the working devices, respectively; a variable orifice 30 installed in a confluence passage 22 for connecting in parallel a flow path L2 branched from the upstream side of the second center bypass passage 9 and the second center bypass passage 9, and shifted in response to the signal pressure supplied from the pilot pump 3, in the working mode for simultaneously operating the traveling device and the working device, to intercept the supply of the hydraulic fluid, being supplied to the working device, toward the traveling device through the confluence passage 22 if a load pressure generated in the working device is relatively higher than a load pressure of the traveling device; a mode selection device 31 for selecting a specified working mode; and a controller 32 for outputting control signals to electro proportional valves 19 and 20 for variably controlling inclination angles of swash plates of the first and second hydraulic pumps 1 and 2 and to electric control valves 21 and 25 for controlling the signal pressures fed from the pilot pump 3 to the variable orifice 30, so as to control discharged flow rates of the first and second variable displacement hydraulic pumps 1 and 2 in accordance with the working mode selected through the mode selection device 31.

Since the above-described construction, except for the switching valves 5 and 10 for the left and right traveling motors, and the control valve 26 having an inner circuit for switching inner spools of the straight traveling valve 13 when the switching valves 6, 7, 8, 11, and 12 for the working devices are simultaneously shifted, is substantially the same as the construction as illustrated in FIG. 3, the detailed description thereof will be omitted. In the following description of the present invention, the same drawing reference numerals are used for the same elements across various figures.

Hereinafter, the operation of the traveling device for crawler type heavy equipment according to another embodiment of the present invention will be described in detail with reference to the accompanying drawings.

As illustrated in FIG. 4, in the case of selecting a working mode in which the traveling device and the working device are simultaneously operated through the mode selection device 31, inner spools of the electric control valve 25 are shifted in downward direction as shown in the drawings by the control signal outputted from the controller 32. Accordingly, the signal pressure from the pilot pump 3 is supplied to the variable orifice 30 installed in the confluence passage 22 through the electric control valve 25 and a pilot flow path 27, and thus the inner spools of the electric control valve 25 are shifted in upward direction as shown in the drawing.

That is, as the confluence passage 22 is blocked, a part of the hydraulic fluid fed from the second hydraulic pump 2 to the working device is prevented from being supplied to the traveling device side, and thus the abrupt increase of the traveling speed can be prevented.

On the other hand, in the case of simultaneously operating the traveling device and the working device, the inner circuit formed inside the control valve 26 to supply the signal pressure to the straight traveling valve 13 includes a port A for the inflow of the signal pressure through the pilot flow path 29, which is branched from a flow path between the pilot pump 3 and the electric control valve 25, to the inside of the control valve 26; a first flow path 40 through which the signal pressure inputted to the port A is supplied to a hydraulic tank through a first orifice a and the switching valve 5 for the traveling motor; a second flow path 41 through which the signal pressure inputted to the port A is supplied to the hydraulic tank through a second orifice b, the switching valve 5 for the traveling motor, and the switching valve 10 for the traveling motor; a third flow path 42 branched from the first flow pat 40 and supplying the signal pressure- to the straight traveling valve 13 to shift the straight traveling valve 13; and a fourth flow path 43 through which the signal pressure inputted to the port A is supplied to the third flow path 42 through a third orifice c, the switching valves 6, 7, 8, 12, and 11 for the working devices, and the switching valve 10 for the traveling motor.

That is, in the case of simultaneously shifting either of the switching valves 5 and 10 for the left and right traveling motors and the switching valves 6, 7, 8, 11, and 12 for the working devices, the signal pressure formed inside the control valve 26 is supplied to the straight traveling valve 13 through the third flow path 42, and the inner spools thereof are shifted in the right direction as shown in the drawing.

Accordingly, the hydraulic fluid from the first hydraulic pump 1 is supplied to the switching valve 10 for the right traveling motor through the switching valve 5 for the left traveling motor and the shifted straight traveling valve 13. The hydraulic fluid from the second hydraulic pump 2 is supplied to the switching valves 6, 7, and 8 for the working devices through the switching valves 11 and 12 for the working devices and the shifted straight traveling valve 13 in the flow path L2.

As described above, the traveling device for crawler type heavy equipment according to embodiments of the present invention has the following advantages.

In the case of performing a combined work by simultaneously operating the traveling device and the working device of the excavator, the abrupt change of the traveling speed is prevented to reduce shock that an operator feels, and an erroneous manipulation of the equipment is prevented to secure the safety.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A traveling device for crawler type heavy equipment, comprising:
   first and second variable displacement hydraulic pumps;
   a switching valve for a left traveling motor and switching valves for working devices which are installed in a first center bypass passage of the first hydraulic pump;
   a switching valve for a right traveling motor and switching valves for working devices which are installed in a second center bypass passage of the second hydraulic pump;
   a straight traveling valve installed on an upstream side of the second center bypass passage, and shifted in response to a signal pressure supplied from an outside, in a working mode for simultaneously operating the traveling device and the working device, to supply hydraulic fluid fed from the first hydraulic pump to the switching valves for the left and right traveling motors, respectively, and to supply hydraulic fluid fed from the second hydraulic pump to the switching valves for the working devices, respectively;
   a variable orifice installed in a confluence passage for connecting in parallel a flow path branched from the upstream side of the second center bypass passage and the second center bypass passage, and shifted in response to the signal pressure supplied from the outside, in the working mode for simultaneously operating the traveling device and the working device, to intercept the supply of the hydraulic fluid, being supplied to the working device, toward the traveling device through the confluence passage if a load pressure generated in the working device is relatively higher than a load pressure of the traveling device;
   a mode selection device for selecting a working mode;
   a controller for outputting control signals to electro proportional valves for variably controlling inclination angles of swash plates of the first and second hydraulic pumps and to electric control valves for controlling the signal pressures fed to the straight traveling valve and the variable orifice, so as to control discharged flow rates of the first and second hydraulic pumps in accordance with the working mode selected through the mode selection device;
   manipulation sensing devices for the working devices for sensing the signal pressure fed to the switching valves for the working devices connected to the first and second hydraulic pumps, respectively, when joysticks are manipulated, and outputting sensed signals to the controller; and
   manipulation sensing devices for the traveling device for sensing the signal pressure fed to the switching valves for the left and right traveling motors, when traveling pedals are pressed, and outputting sensed signals to the controller,
   wherein the electric control valve comprises an electro proportional valve shifted, in response to an input of the control signal from the controller, to control the signal pressure being supplied to the straight traveling valve and the variable orifice, respectively, and wherein the manipulation sensing device for the traveling device or the working device comprises a pressure sensor.

2. The traveling device of claim 1, wherein the electric control valve comprises a solenoid valve shifted, in response to an input of the control signal from the controller, to control the signal pressure being supplied to the straight traveling valve and the variable orifice, respectively.

* * * * *